Oct. 8, 1963  J. M. LIEBIG  3,106,406
OIL SEAL
Filed June 29, 1960
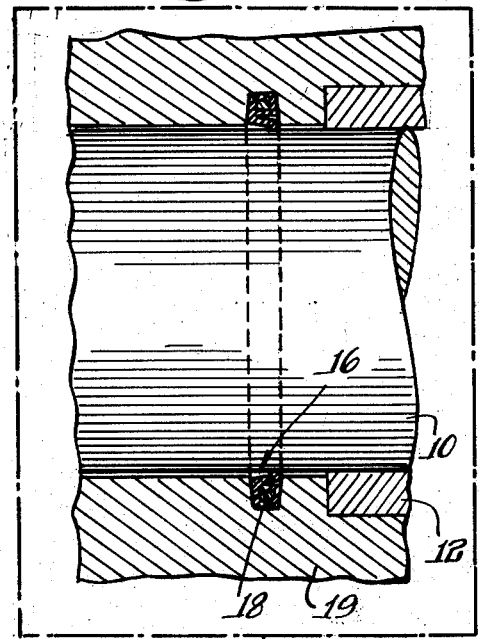
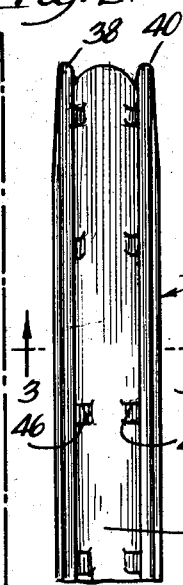
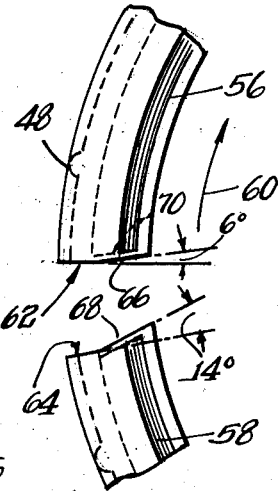
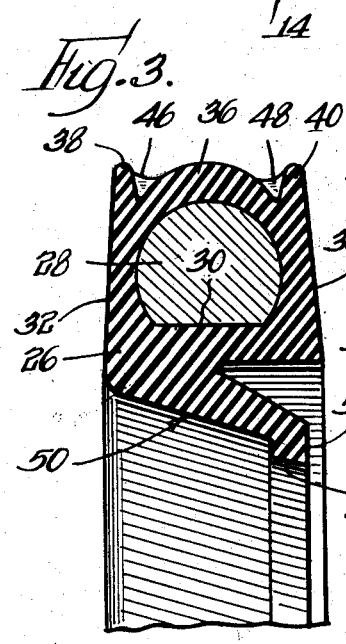
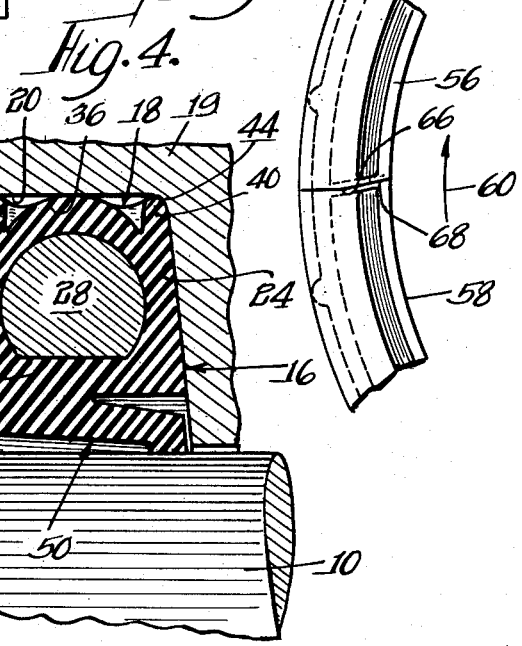
INVENTOR.
Joseph M. Liebig
BY Olson & Trexler United States Patent Office 3,106,406
Patented Oct. 8, 1963

3,106,406
OIL SEAL
Joseph M. Liebig, Wheaton, Ill., assignor to Illinois Milling, Inc., Chicago, Ill., a corporation of Illinois
Filed June 29, 1960, Ser. No. 39,491
6 Claims. (Cl. 277—171)

The present invention relates to the sealing of journals against the escape of oil or other fluids therealong, and is concerned more particularly with forming a fluid-tight seal around the journal of a crankshaft in internal combustion engines.

One object of the invention is to provide a new and improved oil seal which is well adapted for sealing a crankshaft journal, or the like.

Another object is to provide, for use in sealing a journal, a new and improved seal which provides an extremely dependable and highly effective seal against the escape of fluid along the journal over a prolonged service life.

Another object is to provide an improved oil seal, as recited in the preceding objects, which has a novel and extremely sturdy construction that is well adapted to be easily assembled in encircling relation to a journal, and reliably supported in a simple mounting groove in a manner which provides effective assurance against the escape of fluid past the seal over a long service life.

Another object is to provide an improved oil seal, as recited in the previous objects, which is formed in separable segments adapted to be easily assembled in encircling relation to a journal, and having a highly advantageous construction which prevents leakage past the seal formed by the assembled segments.

Other objects and advantages will become apparent from the following description of the exemplary embodiment of the invention illustrated in the drawings, in which:

FIGURE 1 is a longitudinal sectional view of crankshaft journal support structure incorporating an exemplary embodiment of the invention;

FIG. 2 is a fragmentary view of the improved oil seal provided by the invention, as viewed from its outer periphery;

FIG. 3 is a transverse sectional view of the sealing ring, taken with reference to the line 3—3 of FIG. 2;

FIG. 4 is a sectional view similar to FIG. 3, but showing the seal mounted in a support groove and engaging a coacting journal;

FIG. 5 is an exploded fragmentary view of the seal showing two adjacent ends of two segments of the seal in opposed spaced relation to each other; and FIG. 6 is a fragmentary view of the oil seal showing adjacent ends of the seal segments in their normal, abutting engagement with each other.

Referring to the drawings in greater detail, FIGURE 1 illustrates a challenging environmental situation in which the improved oil seal provided by the invention is particularly advantageous. This figure illustrates the support of a crankshaft journal 10 in the rear crankshaft bearing 12 of an automotive vehicle engine, illustrated diagrammatically in this figure, and identified by the reference number 14.

The escape of oil along the rotary journal 10 is prevented by an annular oil seal 16 constructed in accordance with the invention and supported, as illustrated in FIG. 1, in a simple annular groove 18 formed in bearing support structure 19 which encircles the journal. As shown on a larger scale in FIG. 4, the groove 18 which receives the improved oil seal 16 has a cylindrical bottom 20 and two annular sidewalls 22, 24 which diverge somewhat in a radially inward direction. Thus, each sidewall, 22, 24 presents an annular grooved surface in the form of a truncated cone. As formed on a production basis, the groove 18 is subject to dimensional deviations from fixed dimensional specifications.

As will presently appear, the improved seal 16 is adapted to fit into the groove 18 and form a highly effective seal with the groove structure which is not adversely affected in different installations by variations in groove size. This eliminates the necessity for precision in the formation of the groove.

Structurally, the oil seal 16 comprises an annular body 26 of elastomeric material shaped to fit snugly within the groove 18. Preferably, the body 26 is formed from silicone rubber. However, other materials of generally similar physical qualities can be used for this purpose, if desired. In general, the material should be resilient and should have an acceptable resistance to attack by fluids which may come into contact with the seal.

The external form of the resilient body 26 is firmly supported internally by a relatively massive internal reinforcing ring or core 28 formed of a strong metal such, for example, as steel. Preferably, the reinforcing core or ring 28 is formed to have a substantially circular shape in transverse section which is modified to define a cylindrical surface 30 of substantial width extending around the inner periphery of the ring.

The reinforcing core 28 is dimensioned in relation to the body 26 so that the width of the core 28 along the axis of the seal is approximately three-quarters of the corresponding overall width of the body along the axis of the seal. This limits the thickness of the elastomeric body material in encompassing the core 28 to provide a firmness of body structure, while at the same time providing resiliency in the body, which enables it to accommodate to and form a tight seal with the groove structure in which the seal is supported.

Opposite sides of the body 26 at the two axial ends of the seal 16 define two truncated conical surfaces 32, 34 which diverge in a radially inward direction. Each conical surface 32, 34 has a very wide apex angle of approximately 77 degrees.

As viewed in transverse section, FIG. 3, the elastomeric body structure 26 includes at its outer periphery a crown portion 36 which covers and conforms in shape to the outer periphery of the core 28, as shown.

The outer periphery of the elastomeric body 26 also defines two annular beads 38, 40 projecting radially outwardly into flush relation to the side surfaces 32, 34, and forming outward continuations of the respective surfaces 32, 34. The maximum diameter of the two beads 38, 40 is approximately equal to the maximum diameter of the crown 36, thus providing for simultaneous engagement of both beads and the crown 36 with the bottom 20 of a support groove 18, as shown in FIG. 4.

Ordinarily, the formation of a seal support groove 18 is such that the junctures between the bottom surface 20 and the two side surfaces 22, 24 of the groove are rounded by fillets 42, 44 of substantial curvature which turn inwardly from the surfaces 22, 24.

Upon positioning of the seal 16 in a support groove 18, the beads 38, 40 engage the groove fillets 42, 44 and are cammed toward each other to allow the crown portion 36 of the seal body 26 to engage the bottom of the groove. A series of circumferentially spaced ribs 46, 48 extending between the crown 36 and the respective beads 38, 40, as shown in FIGS. 2 to 5, yieldably support the respective beads 42, 44 against movement toward each other to assure firm engagement of the beads with the adjacent groove structure. This is of advantage in forming a seal between the body 26 and the groove structure which prevents the escape of fluid around the outer periphery of the oil seal.

The body of the sealing ring 36 thus formed and supported in a groove 18 provides support for an annular sealing lip 50 integrally formed on the inner periphery of the body 26, as shown in FIG. 3. The lip 50, formed of the same resilient material used in the elastomeric body 26, is integrally joined to the inner periphery of the body 26 at one axial end of the body. As viewed in transverse section, the lip 50 cantilevers from its supported end a substantial distance along the axis of the seal to a distal or projecting end which defines an annular sealing surface 52 adapted to encircle and form a tight seal with the cylindrical surface of the journal 10.

When the sealing lip 50 is in its normal unstressed condition, before being assembled around a journal, FIG. 3, the annular sealing surface 52 has a truncated conical shape, the small end of which is more remote from the supported end of the lip 50. Moreover, the shaping of the cantilevering lip 50 is such that the diameter of the journal engaging sealing surface 52 on the distal edge of the lip is substantially less than the diameter of the support edge of the lip.

As shown, the lip 50 is progressively tapered or thinned from its supported edge toward its distal, marginal edge, which is thickened to form an expandable support rim 54 for the surface 52.

The diameter of the sealing surface 52 of the lip 50 is substantially less than the diameter of the journal 10 to be encircled by the seal. Assembly of the seal 16 in encircling relation to the journal 10, as will be described presently, engages the sealing surface 52 with the journal 10 which forces the rim 54 of the lip 50 to expand and move the surface 52 radially outward to conform to the diameter of the journal. In being expanded diametrically, and in conforming to the journal 10, the initially conical sealing surface 52 assumes a cylindrical shape which opposes a substantial cylindrical area of the journal 10.

The sealing surface 52 is yieldably held in effective sealing engagement with the journal 10 over a long service life of the seal, by the continuing action of the cantilevering lip 50 to yieldably seek its original form, and the continuing action of the distal rim 54 to contract to its original diameter.

Easy mounting of the sealing ring 16 in an engine block 18 in encircling relation to a journal 10 is facilitated by forming the ring 16 in two identical semicircular segments identified in FIGS. 5 and 6 by the numbers 56, 58.

The circumferential ends of the two ring segments 56, 58 are shaped to fit together in a manner which prevents the leakage of fluid at the junctures of these segments. For this purpose, the two ends of each segment are shaped somewhat differently from each other in relation to the direction of rotary motion of the coacting journal in relation to the seal. For convenience in description, the direction of rotary motion of the coacting journal relative to the seal is represented in FIGS. 5 and 6 by the arrow 60. The end of each ring segment confronting or opposing the direction of rotation of the coacting journal will be referred to as the "leading" end of the segment, and the other end of the segment will be referred to as the "trailing" end. At both the leading end 62 and the trailing end 64 of each ring segment, the reinforcing core 28 and the elastomeric body 26 terminate abruptly in radial planes. Each segment of the reinforcing ring 28 is embedded in the elastomeric body material which normally extends in a thin layer across the extreme end of the reinforcing ring.

Upon assembly of the two sealing ring segments 56, 58 into a support groove 18, the crown portion 36 of the ring bottoms in the groove to yieldably yet forcefully support the coacting ends 62, 64 of the ring segments in firm abutting engagement with each other.

The abutting ends of the lip portions of the two ring segments are shaped in relation to each other to prevent leakage between the lip segments.

For this purpose, the lip 50 is shaped at the leading end 62 of each ring segment to define an end face 66 which extends from the sealing ring body toward the center of the sealing ring at an angle which is turned six degrees in a trailing direction from a radial line through the end face 66, as shown in FIG. 5.

This leading face 66 of each lip segment is opposed by a face 68 formed on the trailing end of the other ring segment and extending from the ring body toward the center of the ring at an angle which is turned fourteen degrees in a trailing direction from a radial line through the face 68, as shown in FIG. 5.

The orientation of the lip faces 66, 68 which oppose each other upon assembly of the ring segments around a journal is such that the abutting ends of the ring segments are effectively sealed together to prevent the escape of oil therebetween.

It will be appreciated that the invention is not necessarily limited to use of the precise structure illustrated, but includes the use of variants within the scope of the invention as defined by the claims.

The invention is claimed as follows:

1. An oil seal ring adapted to be seated in substantially fixed position in a relatively fixed annular support groove to form a circumferential seal around a relatively rotatable journal and comprising, circular metal core means embedded in circular body means of elastomeric material, said body means defining two conical side walls converging toward each other in a radially outward direction, an annular lip formed on the inner periphery of said body means and shaped in transverse section to cantilever along the axis of the ring, said lip defining a circumferential sealing surface adapted to sealably encircle a journal and having when in its unstressed condition a diameter which is constricted in relation to the remaining portion of the ring structure, whereby said ring is adapted to fit around a journal larger in diameter than the minimum diameter of said sealing surface when said lip is in its unstressed condition, said ring being formed in two semicircular segments each having a circumferential trailing end abutting against a circumferential leading end of the other segment, said annular lip at the trailing end of each ring segment defining an end face which extends radially inward at a trailing angle of approximately 14 degrees with respect to a radial line through said end face, and said lip at the leading end of each ring segment defining an end face which is inclined in a trailing direction at an angle of approximately 6 degrees to a radial line therethrough.

2. For forming a rotary seal around a journal, an oil ring adapted to be substantially fixedly mounted in a relatively fixed annular groove and comprising, an annular body formed of resilient material, hard reinforcing means embedded in said body, said body defining at opposite axial ends thereof two conical sealing surfaces which converge toward each other in a radially outward direction, the outer periphery of said body defining two annular beads thereon flush with and forming radially outward continuations of said conical surfaces, said beads being adapted to seat in the bottom of an annular groove and form a seal therewith, a plurality of circumferentially spaced supporting webs coacting with said beads yieldably to support each bead against deflection toward the other bead, a generally conical sealing lip having a relatively thick base on the inner periphery of said ring body and tapering substantially uniformly therefrom to cantilever in transverse section a substantial distance along the axis of said ring, and said lip defining a conical annular sealing surface spaced axially from the base of said lip and having a diameter substantially less than the base of said lip whereby said lip can be stretched circumferentially to fit around a coacting relatively rotatable journal and cause said sealing surface to be yieldably held in circumferential sealing engagement with the journal.

3. Shaft sealing means adapted to be seated in substantially fixed position in relatively fixed annular support groove having opposite side walls which diverge radially inward in relation to each other, said sealing means comprising, in combination, two identical semicircular ring elements adapted to be disposed in complementary relation to each other to form a continuous circular sealing ring, each ring element including a semicircular body of elastomeric material, each ring element body defining two semiconical side walls having wide angle apices pointing away from each other whereby the ring element is adapted to seat sealably in an arcuate support groove having side walls diverging radially inward, the inner periphery of each ring element defining an arcuate sealing lip shaped as viewed in transverse section to cantilever a substantial distance along the axis of revolution of the ring element, the projecting edge of said lip defining a narrow sealing surface adapted to fit slidably against a relatively rotary shaft, each ring element having two abrupt circumferential ends adapted to abut against adjacent ends of the other element, one of said ends of each ring element being a trailing end at which the circumferential end of said lip defines a circumferential end face extending from said body toward the axis of revolution of said ring element at a trailing angle of approximately fourteen degrees with respect to a radial line extending from the end face to said axis of revolution, and the other circumferential end of each ring element constituting a leading end at which said lip defines an end face extending radially inward at a trailing angle of approximately six degrees with respect to an adjacent radial line.

4. For forming a rotary seal around a journal, an oil ring adapted to be substantially fixedly mounted in a relatively fixed annular groove and comprising, an annular body formed of resilient material, circular reinforcing means embedded in said body, said body defining at opposite axial ends thereof two conical sealing surfaces which converge toward each other in a radially outward direction, the outer periphery of said body defining two annular beads thereon flush with and forming radially outward continuations of said conical surfaces, said beads being adapted to seat in the bottom of an annular groove and form a seal therewith, said body defining an annular crown on the outer periphery thereof located between said beads and adapted to bottom in a support groove to provide radial support to the oil ring, said crown and said beads terminating radially at substantially the same distance from the center of rotation of said body, a generally conical sealing lip having a relatively thick base on the inner periphery of said ring body and tapering substantially uniformly therefrom to cantilever in transverse section a substantial distance along the axis of said ring, and said lip defining an annular sealing surface spaced axially from the base of said lip and having a diameter substantially less than the base of said lip whereby said lip can be stretched circumferentially to fit around a relatively rotatable coacting journal and cause said sealing surface to be yieldably held in circumferential sealing engagement with the journal.

5. An oil seal ring adapted to be seated in substantially fixed position in a relatively fixed annular support groove to form a circumferential seal around a relatively rotatable journal and comprising, an annular body of yieldable material adapted to fit in a support groove, circular metal core means embedded in said body, an annular lip integrally formed on the inner periphery of said body and shaped in transverse section to cantilever along the axis of the ring, said lip defining a constricted annular sealing surface axially displaced from the base of the lip and adapted to sealably encircle a journal, said ring being formed in two semicircular segments each having a circumferential trailing end abutting against a circumferential leading end of the other segment, said annular lip at the trailing end of each end segment defining an end face which extends radially inward at an angle which is turned in a trailing direction with respect to a radial line through said end face, and said lip at the leading end of each ring segment defining an end face which is turned in a trailing direction with respect to an adjacent radial line at an angle which is substantially less than said first mentioned angle whereby the opposed trailing and leading end faces of the lip are firmly pressed together upon installation of said ring segments in a support groove in encircling relation to a journal.

6. An oil ring for forming a seal about a relatively rotatable shaft or the like and adapted to be substantially fixedly mounted on a relatively fixed annular groove and comprising an annular body of resilient material, said body in section being of block-like construction and being adapted to be received in an annular groove, said body at its outer periphery being provided with a pair of annular beads substantially at the axial limits of said body and adapted to seat in the bottom of an annular groove and form a seal therewith, said body further having an annular crown on the outer periphery thereof between said beads, said beads and said crown terminating at substantially the same distance radially of the center of rotation of said ring and said crown likewise being adapted to bottom in an annular groove to provide radial support to the ring, integral reinforcing flanges extending between said crown and said bead, said ring further having a sealing lip, said lip having a relatively wide and thick base integral with said body at the inner periphery thereof and extending radially inward and axially from said base, said lip being progressively spaced farther from said body and being progressively tapered progressing from said base, said lip at a position remote from the base thereof having a sealing surface for engaging a relatively rotatable shaft or the like, said surface in normal unstressed condition being of less diameter than said shaft and being stressed thereby with consequent radially outward deflection of said lip.

References Cited in the file of this patent

UNITED STATES PATENTS

| | | |
|---|---|---|
| 1,976,797 | Naylor | Oct. 16, 1934 |
| 2,036,320 | Connelly et al. | Apr. 7, 1936 |
| 2,719,743 | Brummer et al. | Oct. 4, 1955 |
| 2,729,481 | Chambers et al. | Jan. 3, 1956 |
| 2,731,284 | Chambers et al. | Jan. 17, 1956 |
| 2,872,219 | Cobb | Feb. 3, 1959 |
| 2,974,646 | Miller et al. | Mar. 14, 1961 |
| 3,027,167 | Liebig | Mar. 27, 1962 |